(12) United States Patent
Chu et al.

(10) Patent No.: US 9,559,361 B2
(45) Date of Patent: Jan. 31, 2017

(54) MODIFIED GUARAN BINDER FOR LITHIUM ION BATTERIES AND METHODS FOR PRODUCING THE SAME

(71) Applicant: HERCULES INCORPORATED, Wilmington, DE (US)

(72) Inventors: Sung Gun Chu, Hockessin, DE (US); Feng Gao, Hockessin, DE (US); Alan Edward Goliaszewski, Hockessin, DE (US); Shufu Peng, Hockessin, DE (US)

(73) Assignee: HERCULES LLC, Wilmington, DE (US)

( * ) Notice: Subject to any disclaimer, the term of this patent is extended or adjusted under 35 U.S.C. 154(b) by 14 days.

(21) Appl. No.: 14/627,249

(22) Filed: Feb. 20, 2015

(65) Prior Publication Data

US 2015/0243994 A1    Aug. 27, 2015

Related U.S. Application Data

(60) Provisional application No. 61/943,124, filed on Feb. 21, 2014.

(51) Int. Cl.
| | |
|---|---|
| *H01M 4/13* | (2010.01) |
| *H01M 4/62* | (2006.01) |
| *C08L 1/28* | (2006.01) |
| *C08L 5/00* | (2006.01) |
| *C08L 5/04* | (2006.01) |
| *C08L 63/00* | (2006.01) |
| *H01M 4/38* | (2006.01) |
| *H01M 4/48* | (2010.01) |
| *H01M 4/505* | (2010.01) |
| *H01M 4/525* | (2010.01) |
| *H01M 4/58* | (2010.01) |
| *H01M 4/587* | (2010.01) |
| *H01M 4/66* | (2006.01) |
| *C08B 37/00* | (2006.01) |
| *C09J 101/28* | (2006.01) |
| *C09J 105/00* | (2006.01) |
| *C09J 105/04* | (2006.01) |

(52) U.S. Cl.
CPC .......... *H01M 4/622* (2013.01); *C08B 37/0096* (2013.01); *C08L 1/286* (2013.01); *C08L 5/00* (2013.01); *C08L 5/04* (2013.01); *C08L 63/00* (2013.01); *C09J 101/284* (2013.01); *C09J 101/286* (2013.01); *C09J 105/00* (2013.01); *C09J 105/04* (2013.01); *H01M 4/13* (2013.01); *H01M 4/386* (2013.01); *H01M 4/48* (2013.01); *H01M 4/505* (2013.01); *H01M 4/525* (2013.01); *H01M 4/587* (2013.01); *H01M 4/5825* (2013.01); *H01M 4/661* (2013.01); *H01M 4/663* (2013.01); *H01M 4/669* (2013.01)

(58) Field of Classification Search
CPC ...... H01M 4/622; H01M 4/661; H01M 4/663; H01M 4/13; H01M 4/386; H01M 4/45; H01M 4/505; H01M 4/525; H01M 4/5825; H01M 4/587
See application file for complete search history.

(56) References Cited

U.S. PATENT DOCUMENTS

| | | | |
|---|---|---|---|
| 3,880,672 | A | 4/1975 | Megahed et al. |
| 6,071,325 | A | 6/2000 | Schmitt |
| 7,491,467 | B2 | 2/2009 | Satho et al. |
| 8,652,688 | B2 | 2/2014 | Yushin et al. |
| 2012/0313051 | A1 | 12/2012 | Remizov et al. |
| 2013/0183578 | A1* | 7/2013 | Oya ............... H01M 4/505 429/200 |
| 2014/0335409 | A1 | 11/2014 | Wang et al. |
| 2015/0107093 | A1* | 4/2015 | Luo ............... H01M 4/13 29/623.1 |

FOREIGN PATENT DOCUMENTS

EP    2395060 A1    12/2011

OTHER PUBLICATIONS

International Search Report of International Application No. PCT/US2015/016832 mailed on Jun. 8, 2015.

* cited by examiner

*Primary Examiner* — Jane Rhee
(74) *Attorney, Agent, or Firm* — Dunlap Codding, P.C.; Shaorong Chen

(57) ABSTRACT

The presently disclosed and/or claimed inventive concept(s) relates generally to a composition of a slurry for use in preparation of a lithium ion battery. The slurry comprises a binder composition comprising a modified guaran for use in battery electrodes and methods of preparing such. The presently disclosed and/or claimed inventive concept(s) also relates to compositions and methods of making electrodes, either anodes and/or cathodes, with the binder composition comprising the modified guaran.

21 Claims, No Drawings

US 9,559,361 B2

MODIFIED GUARAN BINDER FOR LITHIUM ION BATTERIES AND METHODS FOR PRODUCING THE SAME

CROSS REFERENCE TO RELATED APPLICATIONS

The present application claims the benefit under 35 U.S.C. 119 (e) of U.S. Provisional Patent Application Ser. No. 61/943,124, filed on Feb. 21, 2014, the entire content of which is hereby expressly incorporated herein by reference.

BACKGROUND

1. Field of the Invention

The presently disclosed and/or claimed inventive process (es), procedure(s), method(s), product(s), result(s), and/or concept(s) (collectively referred to hereinafter as the "presently disclosed and/or claimed inventive concept(s)") relates generally to a slurry for use in battery electrodes and methods of preparing such. More particularly, but not by way of limitation, the presently disclosed and/or claimed inventive concept(s) relates to the slurry comprising a binder composition comprising a modified guaran. Additionally, the presently disclosed and/or claimed inventive concept(s) relates to compositions of electrodes and methods of making the electrodes, either anodes and/or cathodes, with the binder composition comprising the modified guaran.

2. Background of the Invention

Lithium batteries are used in many products including medical devices, electric cars, airplanes, and most notably, consumer products such as laptop computers, cell phones, and cameras. Due to their high energy densities, high operating voltages, and low-self discharges, lithium ion batteries have overtaken the secondary battery market and continue to find new uses in products and developing industries.

Generally, lithium ion batteries (LIBs) comprise an anode, a cathode, and an electrolyte material such as an organic solvent containing a lithium salt. More specifically, the anode and cathode (collectively, "electrodes") are formed by mixing either an anode active material or a cathode active material with a binder and a solvent to form a paste or slurry which is then coated and dried on a current collector made of a material, such as aluminum or copper, to form a film on the current collector. The anodes and cathodes are then layered or coiled prior to being housed in a pressurized casing containing an electrolyte material, which all together forms a lithium ion battery.

When making electrodes, it is important to select a binder with sufficient adhesive and chemical properties such that the film coated on the current collector will maintain contact with the current collector even when manipulated to fit into the pressurized battery casing. Since the film contains the electrode active material, there will likely be significant interference with the electrochemical properties of the battery if the film does not maintain sufficient contact with the current collector. Additionally, it is important to select a binder that is mechanically compatible with the electrode active material(s) such that it is capable of withstanding the degree of expansion and contraction of the electrode active material(s) during charging and discharging of the battery. As electrode active materials continue to evolve, binders will need to continue to adapt in order to remain mechanically compatible with the evolving electrode active materials. If not, large capacity fades during cycling can result from the use of new electrode active materials like, for example, silicon-containing with currently existing binder compositions. As such, binders play an important role in the performance of lithium ion batteries.

Currently, lithium ion battery technology generally teaches binder compositions comprising cellulosic materials selected from carboxymethylcellulose, carboxyethylcellulose, aminoethylcellulose, and/or oxyethylcellulose. More specifically, carboxymethylcellulose (CMC) has become the preferred choice of cellulose material to be included in LIB binders comprising graphite as the anode active material. See, for example, US 2004/0258991 filed by Young-Min Choi et al., hereby incorporated herein by reference in its entirety. Binder compositions comprising these cellulose derivatives alone may not have the mechanical properties necessary, however, to support the large volume changes that occur with some of the electrode active materials currently interested.

Specifically, silicon-containing material has recently come to the forefront as a promising anode active material for LIBs. See, for example, B. Lestriez et al., *On the Binding Mechanism of CMC in Si Negative Electrodes for Li-Ion Batteries*, Electrochemistry Communications, vol. 9, 2801-2806 (2007), which is hereby incorporated herein by reference in its entirety. Some of the reasons that silicon-containing material has come to the forefront as a promising anode active material are: its high theoretical specific capacity of 4200 mAhg$^{-1}$ for Li$_{4.4}$Si, low electrochemical potential between 0 and 0.4 V versus Li/Li$^+$, and a small initial irreversible capacity compared with other metal- or alloy-based anode materials. See, B. Koo et al., *A Highly Cross-linked Polymeric Binder for High-Performance Silicon Negative Electrodes in Lithium Ion Batteries*, Angew. Chem. Int. Ed. 2012, 51, 8762-8767, hereby incorporated herein by reference in its entirety. It has been found herein that a specific capacity of about 600 mAhg$^{-1}$ can be achieved by mixing graphite with silicon oxide (SiO$_x$) and conductive carbon at a weight ratio of about 0.795/0.163/0.042 and, alternatively, a specific capacity of about 450 mAhg$^{-1}$ can be achieved by mixing graphite with silicon oxide at a weight ratio of about 92 to 5, both of which increase the specific capacity of the anode material above the 340 mAhg$^{-1}$ associated with graphite independent of any other electrode active material. Silicon-containing material has been known, however, to undergo large volume changes during charging and discharging, which can cause problems for a battery's capacity and overall performance.

The presently disclosed and/or claimed binder compositions comprising a guaran and/or modified guaran, however, actually improve the capacity of lithium ion batteries comprising a silicon-containing electrode active material. This is due in part to guaran having a high molecular weight and strong adhesive properties, which contribute to guaran being capable of withstanding the large volume changes generally associated with silicon-containing electrode active materials.

DETAILED DESCRIPTION OF THE INVENTIVE CONCEPT(S)

Before explaining at least one embodiment of the presently disclosed and/or claimed inventive concept(s) in detail, it is to be understood that the presently disclosed and/or claimed inventive concept(s) is not limited in its application to the details of construction and the arrangement of the components or steps or methodologies set forth in the following description or illustrated in the drawings. The presently disclosed and/or claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the presently disclosed and/or claimed inventive concept(s) have been described in terms of preferred embodiments, it will be apparent to those of ordinary skill in the art that variations may be applied to the articles and/or methods and in the steps or in the sequence of steps of the method described herein without departing from the concept, spirit and scope of the presently disclosed and/or claimed inventive concept(s). All such similar substitutes and modifications apparent to those skilled in the art are deemed to be within the spirit, scope and concept of the presently disclosed and/or claimed inventive concept(s).

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicates to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein any reference to "one embodiment" or "an embodiment" means that a particular element, feature, structure, or characteristic described in connection with the embodiment is included in at least one embodiment. The appearance of the phrase "in one embodiment" in various places in the specification are not necessarily all referring to the same embodiment.

As used herein, the term "copolymer" shall be defined as a polymer(s) prepared from polymerizing two or more different monomers and should not be construed to mean a polymer prepared from polymerizing only two different monomers.

The presently disclosed and/or claimed inventive concept(s) encompasses a slurry for use in the preparation of a lithium ion battery electrode comprising, consisting of, or consisting essentially of (i) an electrode active material, (ii) a binder composition comprising a guaran/modified guaran, and (iii) water.

The presently disclosed and/or claimed inventive concept(s) also encompasses a film for use in preparation of a lithium ion battery, comprising a binder composition comprising a guaran/modified guaran and an electrode active material.

The electrode active material can be an anode active material. The anode active material can be any material comprising, consisting of, or consisting essentially of (1) at least one of an artificial graphite, a natural graphite, surface modified graphite, coke, hard carbon, soft carbon, carbon fiber, conductive carbon, and combinations thereof, (2) silicon-based alloys, (3) complex compounds comprising, consisting of, or consisting essentially of: i) at least one of artificial graphite, natural graphite, surface modified graphite, coke, hard carbon, soft carbon, carbon fiber, conductive carbon and combinations thereof, and ii) a metal selected from the group consisting of Al, Ag, Bi, In, Ge, Mg, Pb, Si, Sn, Ti, and combinations thereof, (4) a lithium complex metal oxide, (5) lithium-containing nitrides, (6) silicon-graphene, (7) a silicon-carbon nanotube, (8) silicon oxide, and (9) combinations thereof.

The anode active material, in one non-limiting embodiment, can be selected from the group consisting of artificial graphite, natural graphite, surface modified graphite, coke, hard carbon, soft carbon, carbon fiber, conductive carbon, and combinations thereof. In another non-limiting embodiment, the anode active material comprises a complex compound comprising, consisting of, or consisting essentially of (i) at least one of artificial graphite, natural graphite, surface modified graphite, coke, hard carbon, soft carbon, carbon fiber, conductive carbon, and combinations thereof, and (ii) silicon and/or silicon oxide. The anode active material, in yet another non-limiting embodiment, can comprise, consist of, or consist essentially of lithium titanate ($Li_4Ti_5O_{12}$).

The anode active material can also comprise silicon oxide and/or carbon coated silicon oxide. In one non-limiting embodiment, the anode active material can be a mixture of graphite and silicon oxide, wherein the silicon oxide can, for example but without limitation, be represented by the formula $SiO_x$, wherein $1 \leq x < 2$, and further wherein the weight ratio of graphite to silicon oxide may be at least 50:50, or in a range of from about 70:30 to about 99:1, or from about 80:10 to about 95:5, or from about 90:10 to about 95:5. The above-described anode active material comprising graphite and silicon oxide can further comprise conductive carbon in a range from about 0.1 to about 10 wt %, or from about 1 to about 8 wt %, or from about 2 to about 5 wt %.

In one non-limiting embodiment, the anode active material may comprise a silicon-graphene composition and/or a combination of a silicon-graphene composition and graphene. See, for example but without limitation, the XG-SIG™ silicon-graphene nano-composite material available from XG Sciences, Inc. (Lansing, Mich.). In another non-limiting embodiment, the anode active material may comprise a silicon alloy, for example but without limitation, silicon titanium nickel alloy (STN), and/or a mixture of a silicon alloy and graphite. More specifically, the electrode active material may comprise silicon alloy and graphite mixture, wherein the silicon alloy is present in a range of from about 30 to 50 wt %, or from about 35 to about 45 wt %, or from about 37.5 to about 42.5 wt %, and wherein the graphite is present in a range from about 50 to about 70 wt %, or from about 55 to about 65 wt % or from about 57.5 to about 62.5 wt %.

The above-described anode active material may comprise a silicon-graphene composition and/or a combination of a silicon-graphene composition and graphite, further comprising conductive carbon. More specifically, the anode active material may comprise silicon-graphene and graphite and/or conductive carbon, wherein the silicon-graphene is present in a range of from about 20 to 95 wt %, or from about 70 to 95 wt %, or from about 75 to 95 wt %, or from about 80 to about 95 wt %, and wherein the graphite is present in a range of from about 5 to about 30 wt %, or from about 10 to about 25 wt %, or from about 10 to about 20 wt %, and wherein the conductive carbon is present in a range of from about 1 to about 10 wt %, or from about 1 to about 8 wt %, or form about 1 to about 5 wt %.

The anode active material can have at least one hydroxyl group on its surface. In one embodiment, the anode active material comprises a silicon-containing material, wherein the silicon-containing material comprises hydroxyl groups in a range of from about 1 to about 4 wt %, or from about 1 to about 3 wt %, or from about 1 to about 2 wt %. The hydroxyl moieties on the surface of a silicon-containing anode active material are able to react with the carboxyl groups of the above-described component and/or the above-described ionizable water soluble polymer by means of a condensation reaction.

The electrode active material can be a cathode active material. The cathode active material can be any material comprising, consisting of, or consisting essentially of lithium-containing transition metal oxides. The cathode active material, in one non-limiting embodiment, can be selected from the group consisting of lithium iron phosphate ($LiFePO_4$), lithium cobalt oxide ($LiCoO_2$), lithium nickel oxide ($LiNiO_2$), lithium nickel cobalt aluminum oxide ($LiNiCoAlO_2$), lithium nickel manganese cobalt oxide ($LiNiMnCoO_2$), lithium manganese oxide ($LiMn_2O_4$), and combinations thereof.

In another non-limiting embodiment, the active cathode materials can be doped by an element, which can include, but are not limited to, boron, magnesium aluminum, titanium, chromium, iron, zirconium, copper, zinc, gallium, yttrium, fluoride, and their combinations. In addition, a thin coating material can also be applied onto the cathode active material surface, which can include, but are not limited to, $ZnO$, $In_2O_3$, $SnO_2$, $Y2O_3$, $La_2O_3$, $Li_2TiO_3$, $CaTiO_3$, $BaTiO_3$, $SrO$, carbon, and combinations thereof.

The modified guaran may comprise, for example but without limitation, carboxyalkyl guaran, carboxyalkyl hydroxypropyl guaran, and combinations thereof. In one embodiment, the modified guaran can be selected from the group consisting of carboxymethyl guaran, carboxymethyl hydroxypropyl guaran, and combinations thereof. The carboxymethyl guaran has a carboxymethyl degree of substitution in a range of from about 0.1 to about 1.0, or from about 0.1 to 0.5, or from about 0.2 to about 0.4 and the carboxymethyl hydroxypropyl guaran has a carboxymethyl degree of substitution in a range of from about 0.1 to about 1.0, or from about 0.1 to 0.5, or from about 0.2 to about 0.4 and a hydroxypropyl molar substitution in a range of from about 0.1 to about 1.0, or from about 0.2 to about 0.7, or from about 0.2 to about 0.4.

The guaran and/or modified guaran can be present in the slurry in a range of from about 1 to about 5 wt % of solids, or from about 1.5 to about 4 wt % of solids, or from about 2 to about 3 wt % of solids; the electrode active material can be present a range of from about 15 to about 65 wt % of solids, or from about 20 to about 40 wt % of solids, or from about 24 to about 36 wt % of solids; and the water can be present in a range of from about 30 to about 90 wt % of slurry, or from about 35 to about 85 wt % of slurry, or from about 40 to about 75 wt % of slurry.

In an alternative embodiment, the guaran and/or modified guaran can be present in the slurry at about 2.5 wt % of solids. In an additional embodiment, the guaran, modified guaran, and/or a second polymer (as described below) can be present in the slurry in a range of from about 1 to about 5 wt % of solids, or from about 1.5 to about 4 wt % of solids, or from about 2 to about 3 wt % of solids; the electrode active material can be present in the slurry in a range of from about 15 to about 65 wt % of solids, or from about 20 to about 40 wt % of solids, or from about 24 to about 36 wt % of solids; and the water can be present in a range of from about 30 to about 90 wt % of slurry, or from about 35 to about 85 wt % of slurry, or from about 40 to about 75 wt % of slurry.

In one non-limiting embodiment, a modified guaran comprises carboxymethyl guaran having a carboxymethyl degree of substitution of about 0.18. In another non-limiting embodiment, a modified guaran comprises carboxymethyl hydroxypropyl guaran having a carboxymethyl degree of substitution of about 0.16 and a hydroxypropyl molar substitution of about 0.4.

In an alternative embodiment, the guaran and/or modified guaran can be a lithiated guaran and/or a lithiated modified guaran. The lithiated modified guaran may be selected from the group consisting of lithiated carboxymethyl guaran, lithiated carboxymethyl hydroxypropyl guaran, and combinations thereof.

In one non-limiting embodiment, the binder composition in the above-described slurry for use in the preparation of a lithium ion battery electrode further comprises other components including second polymers, polycarboxylic acids, cellulose ethers, and combinations thereof.

The second polymers are selected from the group consisting of polyacrylic acid, polyacrylic acid copolymers, methyl vinyl ether and maleic anhydride copolymers, modified methyl vinyl ether and maleic anhydride copolymers, styrene maleic anhydride copolymers, xanthan gum, alginate, gum arabic, styrene butadiene copolymers, polyvinylpyrrolidones, acrylic acrylamide copolymers, acrylic acid acrylamide acrylate copolymers, vinyl acetate ethylene copolymers, and combinations thereof.

The styrene butadiene copolymers, acrylic-acrylamide copolymers, acrylic acid acrylamide acrylate copolymers, and vinyl acetate ethylene copolymers have glass transition temperatures (Tg) below 0° C.

The cellulose ethers comprise at least one of carboxyalkyl cellulose, carboxyalkyl hydroxyalkyl cellulose, and combinations thereof. In one embodiment, the carboxyalkyl cellulose is carboxymethyl cellulose and the carboxyalkyl hydroxyalkyl cellulose is carboxymethyl hydroxyethyl cellulose.

The methyl vinyl ether and maleic anhydride copolymers (also referred to herein as "MVE/MA copolymer(s)") have molecular weights in a range of from about 100,000 to about 3,000,000 Daltons, and are available from Ashland Inc., Covington, Ky. as Gantrez™ polymers.

In one embodiment, the methyl vinyl ether and maleic anhydride copolymer is in a basic solution or in the form of a lithium salt, such that the copolymer may be at least one of a sodium salt of methyl vinyl ether and maleic anhydride copolymer, and a lithium salt of methyl vinyl ether and maleic anhydride copolymer.

The modified methyl vinyl ether and maleic anhydride copolymers (hereinafter also referred to as "modified MVE/MA copolymer(s)") can be prepared from polymerizing methyl vinyl ether, maleic anhydride, and at least one component selected from the group consisting of octylamine, polyetheramines, acrylonitriles, fluorinated vinyl ether, isobutylene, and combinations thereof.

The modified MVE/MA copolymer may be a copolymer prepared by polymerizing octylamine, methyl vinyl ether, and maleic anhydride, wherein the octylamine is present in a range of from about 5 to about 40 mol %, or from about 10 to about 35 mol %, or from about 15 to about 30 mol %; the methyl vinyl ether is present in a range of from about 40 to about 60 mol %, or from about 45 to about 55 mol %; and the maleic anhydride is present in a range of from about 30 to about 70 mol %, or from about 40 to about 60 mol %, or from about 45 to about 55 mol %.

The modified MVE/MA copolymer may also be a copolymer prepared by polymerizing a polyetheramine, methyl vinyl ether, and maleic anhydride, wherein the polyetheramine is present in a range of from about 10 to about 40 mol %, or from about 15 to about 35 mol %, or from about 20 to about 30 mol %; the methyl vinyl ether is present in a range of from about 40 to about 60 mol %, or from about 45 to about 55 mol %; and the maleic anhydride is present in a range of from about 30 to about 70 mol %, or from about 40 to about 60 mol %, or from about 45 to about 55 mol %.

The modified MVE/MA copolymer may be a copolymer prepared by polymerizing isobutylene, methyl vinyl ether, and maleic anhydride, wherein the isobutylene is present in a range of from 10 to about 40 mol %, or from about 15 to about 35 mol %, or from about 20 to about 30 mol %; the methyl vinyl ether is present in a range of from 40 to about 60 mol %, or about 45 to about 55 mol %; and the maleic anhydride is present in a range of from about 30 to about 70 mol %, or from about 40 to about 60 mol %, or from about 45 to about 55 mol %.

The modified MVE/MA copolymer may also be a copolymer prepared by polymerizing octylamine, isobutylene, methyl vinyl ether, and maleic anhydride, wherein the octylamine is present in a range of from about 5 to about 40 mol %, or from about 10 to about 35 mol %, or from about 15 to about 30 mol %; the isobutylene is present in a range of from about 10 to about 40 mol %, or from about 15 to about 35 mol %, or from about 20 to about 30 mol %; the methyl vinyl ether is present in a range of from about 40 to about 60 mol %, or from about 45 to about 55 mol %; and the maleic anhydride is present in a range of from about 30 to about 70 mol %, or from about 40 to about 60 mol %, or from about 45 to about 55 mol %.

The modified MVE/MA copolymer may be a copolymer prepared by polymerizing fluorinated vinyl ether, methyl vinyl ether, and maleic anhydride, wherein the fluorinated vinyl ether is present in a range of from about 5 to about 40 mol %, or from about 5 to about 35 mol %, or from about 5 to about 30 mol %; the methyl vinyl ether is present in a range of from about 35 to about 65 mol %, or from about 40 to about 60 mol %, or from about 45 to about 55 mol %; and the maleic anhydride is present in a range of from about 10 to about 60 mol %, or from about 15 to about 55 mol %, or from about 20 to about 45 mol %.

The modified MVE/MA copolymer may be a copolymer prepared by polymerizing an acrylonitrile, methyl vinyl ether, and maleic anhydride, wherein the acrylonitrile is present in a range of from about 10 to about 50 mol %, or from about 15 to about 40 mol %, or from about 20 to about 35 mol %; the methyl vinyl ether is present in a range of from about 35 to about 65 mol %, or from about 40 to about 60 mol %, or from about 45 to about 55 mol %; and the maleic anhydride is present in a range of from about 5 to about 40 mol %, or from about 10 to about 35 mol %, or from about 15 to about 30 mol %.

The styrene maleic anhydride copolymer may be unmodified styrene maleic anhydride copolymers and/or one or more modified styrene maleic anhydride copolymers selected from the group consisting of ester-modified styrene maleic anhydride copolymers, alcohol-modified styrene maleic anhydride copolymers, amine-modified styrene maleic anhydride copolymers, and combinations thereof.

The polyacrylic acid copolymer can be selected from the group consisting of a copolymer of acrylic acid and methacrylic acid, a copolymer of alkylacrylates and acrylic acid, a copolymer of alkylacrylates and methacrylic acid, and combinations thereof.

In an alternative non-limiting embodiment, the second polymer in the binder composition described above can be lithiated. For example, but without limitation, the lithiated second polymer can be selected from the group consisting of lithiated polyacrylic acid, a lithiated polyacrylic acid copolymer, lithiated methyl vinyl ether and maleic anhydride copolymers, lithiated modified methyl vinyl ether and maleic anhydride copolymers, lithiated styrene maleic anhydride copolymers, lithiated xanthan gum, lithiated alginate, lithiated gum arabic, and combinations thereof.

The polycarboxylic acids are at least one of (i) in a basic solution, and (ii) lithiated, wherein the lithiated polycarboxylic acids are formed by adding the polycarboxylic acids to a lithium hydroxide solution. In one embodiment, the polycarboxylic acid comprises at least one of (i) a sodium salt of the polycarboxylic acid, and (ii) a lithium salt of the polycarboxylic acid. The polycarboxylic acids can be selected from the group consisting of formic acid, acetic acid, chloroacetic acid, dichloroacetic acid, trichloroacetic acid, trifluoroacetic acid, oxalic acid, benzoic acid, and combinations thereof, wherein the polycarboxylic acids are at least one of (i) in a basic solution, and (ii) lithiated.

The cellulose ether as described above can be lithiated. The lithiated cellulose ethers can be selected from lithiated carboxyalkyl cellulose, lithiated carboxyalkyl hydroxyalkyl cellulose, and combination thereof. The lithiated carboxymethyl cellulose can be, for example but without limitation, formed by reacting sodium carboxymethyl cellulose with hydrogen chloride to form carboxymethyl cellulose, which is then reacted with lithium hydroxide in the presence of acetic acid at a pH of around 7 to form lithiated carboxymethyl cellulose.

The above-described slurry has a Brookfield® viscosity in a range of about 500 to about 10,000 mPa·s, or from about 2,000 to about 10,000 mPa·s, or from about 3,000 to about 10,000 mPa·s or from about 4,500 to about 9,000 mPa·s, or from about 5,000 to about 8,000 mPa·s, as measured at 30 RPMs with spindle #4 at ambient conditions.

The slurry has a good stability, wherein the slurry visibly stays in solution for at least 24 hours, or at least 3 days, or at least 5 days.

The binder composition in the above-described slurry can further comprise at least one of (a) an etherification catalyst and (b) an epoxy resin comprising at least two epoxide groups.

In one non-limiting embodiment, the binder composition comprises a guan and/or modified guaran system formed by an esterification reaction between at least one carboxyl group of the above-described second polymer or the polycarboxylic acid and at least one hydroxyl group of the guaran and/or modified guaran in the presence of an esterification catalyst.

In another non-limiting embodiment, the binder composition comprises a guan and/or modified guaran system formed by an esterification reaction between at least one carboxyl group of the above-described second polymer or the polycarboxylic acid, and at least one hydroxyl group of the guaran and/or modified guaran and a silicon-containing electrode active material (described above), in the presence of an esterification catalyst.

The esterification catalyst may be selected from the group consisting of sodium hypophosphite, sulphonic acid, methane sulphonic acid, trifluoromethane sulphonic acid, titanate esters, dialkyl tin, and combinations thereof. The titanate ester can be, for example but without limitation, tetrabutyl titanate. In one embodiment, the esterification catalyst is sodium hypophosphite.

The esterification reaction is driven by removal of water from an aqueous solution comprising the above-described guaran and/or modified guaran, the above-described second polymer or polycarboxylic acid, the above-described esterification catalyst, and, optionally, the above-described electrode active material.

In another non-limiting embodiment, the binder composition comprises a guaran and/or modified guaran system formed by the reaction of an epoxy resin with at least a guaran and/or modified guaran, a second polymer or a polycarboxylic acid, and an electrode active material, wherein (i) at least one epoxide group of the epoxy resin reacts with at least one hydroxyl group of the guaran and/or modified guaran, and (ii) (a) at least one epoxide group of the epoxy resin reacts with at least one carboxyl group of the second polymer or the polycarboxylic acid, and/or (b) at least one epoxide group of the epoxy resin reacts with at least one hydroxyl group on the surface of the electrode active material, and/or (c) at least one epoxide group of the epoxy resin reacts with at least one carboxyl group of the modified guaran. Additionally, an epoxy cross-linking catalyst can be added during the formation of the guaran and/or modified guaran system to catalyze the reaction between the at least one epoxide group of the epoxy resin with the at least one hydroxyl group of the guaran and/or modified guaran and/or the at least one hydroxyl group on the surface of the electrode active material.

The epoxy cross-linking catalyst can be selected from the group consisting of tertiary amines, quaternary amines, imidazoles, phosphonium compounds, chelates, and combinations thereof. The chelates can be, for example but without limitation, zinc chelates, available from King Industries (Norwalk, Conn.) as NACURE® XC-9206. In one embodiment, the epoxy cross-linking catalyst comprises an imidazole. In another embodiment, the epoxy cross-linking catalyst comprises 2-methylimidazole or 2-ethylimidazole. The epoxy cross-linking catalyst can also be selected from those disclosed in the publication, W. Blank et al., "Catalyst if the Epoxy-Carboxyl Reaction", presented at the International Waterborne, High-Solids and Powder Coatings Symposium, Feb. 21-23, 2001, New Orleans, La. USA, which is hereby incorporated herein by reference in its entirety.

The epoxy resin has at least two epoxide groups, wherein the epoxy resin comprises, consists of, or consists essentially of at least one di-epoxy, tri-epoxy, tetra-epoxy, and combinations thereof. The epoxy resin can be bisphenol A diepoxy.

The epoxy resin is in an aqueous dispersion further comprising at least one surfactant, wherein the surfactant can also be referred to herein as a dispersant or emulsifier. The surfactant can be selected from the group consisting of phosphate esters, complex coesters comprising a sodium or potassium salt of an orthophosphate or polyphosphate ester of an alcohol and an adduct of ethylene oxide, imidazolines, amides and combinations thereof. The phosphate ester can be an organic phosphate ester including complex organic orthophosphate or polyphosphate ester acid and its salt. The surfactant may also be selected from those disclosed in U.S. Pat. No. 5,623,046, U.S. Pat. No. 3,301,804 (employing the reaction product of a boric acid with both an alkylene glycol and beta-dialkyl-substituted aminoalkanol as an emulsifier), U.S. Pat. No. 3,634,348 (employing a phosphate ester as an emulsifying agent), U.S. Pat. No. 3,249,412 (employing in combination a cationic emulsifying agent selected from the group consisting of imidazolines and amides and a non-ionic emulsifying agent), and Specialty Chemicals Bulletin SC-201 entitled "Water-Reducible Coatings via Epoxy Resin Modification with Jeffamine (Reg. TM) ED-2001 and Jeffamine (Reg. TM) M-1000" available from Texaco Chemical Company (Bellaire, Tex.), all of which are hereby incorporated herein by reference in their entirety. In one embodiment, the aqueous epoxy resin dispersion is a non-ionic aqueous dispersion of bisphenol A diepoxy available as EPI-REZ® 6520-WH-53 available from Momentive Specialty Chemicals (Columbus, Ohio).

The film can be prepared by combining the modified guaran or guaran system and the electrode active material in water to form a slurry, which is thereafter dried. The film has a thickness in a range of from about 10 to about 60 μm, or from about 15 about 50 μm, or from about 15 μm to about 30 μm.

The above-described film can be bound to a surface of a current collector to form a bond. The current collector can comprise any material that acts as an electrical conductor for either the anode or cathode active materials. In one embodiment, the current collector can be made of materials selected from the group consisting of aluminum, carbon, copper, stainless steel, nickel, zinc, silver, and combinations thereof. In one non-limiting embodiment, the current collector for the anode comprises copper foil. In another non-limiting embodiment, the current collector for the cathode comprises aluminum foil.

In one non-limiting embodiment, the adhesive strength of the bond is at least about 0.3 gf/mm, or at least about 0.4 gf/mm, or at least about 0.5 gf/mm.

Additionally, the presently disclosed and/or claimed inventive concept(s) encompasses an electrode comprising, consisting of, or consisting essentially of (i) a film comprising, consisting of, or consisting essentially of (1) an electrode active material (as described above), and (2) a binder composition comprising a modified guaran or guaran system (as described above), and (ii) a current collector (as described above). In one embodiment, the electrode active material is present in the film in a range of from about 65 to about 99 wt %, or from about 70 to about 98.5 wt %, or from about 75 to about 98 wt % and the binder composition is present in the film in a range of from about 1 to about 35 wt %, or from about 1.5 to about 30 wt %, or from about 2 to about 25 wt %.

In an alternative embodiment, the electrode comprises, consists of, or consists essentially of (i) a film comprising, consisting of, or consisting essentially of (1) an electrode active material (as described above), and (2) a binder composition comprising a modified guaran or guaran system (as described above) and other components including a second polymer, polycarboxylic acid and a cellulose ether (as described above), and (ii) a current collector (as described above). In one embodiment, the electrode active material is present in the film in a range of from about 65 to about 98.5 wt %, or from about 70 to about 98 wt % or from about 75 to about 98 wt %, and the binder composition is present in the film in a range of from about 1 to about 35 wt %, or from about 1.5 to about 30 wt %, or from about 2 to about 25 wt %.

The presently disclosed and/or claimed invention also encompasses a method(s) for making an electrode(s) comprising, consisting of, or consisting essentially of the steps of: (i) combining an electrode active material (as described above), a binder comprising a guaran and/or modified guaran and/or a guaran and/or modified guaran system (as described above), optionally, other component including a second polymer, polycarboxylic acid and a cellulose ether (as described above), and water to form a slurry (as described above); (ii) applying the above-described slurry to a current collector to form a coated current collector comprising a slurry layer on the current collector, and (iii) drying the slurry layer on the coated current collector to form a film on the current collector, wherein the electrode comprises the film and the current collector.

In one embodiment, the step of drying the slurry on the current collector comprises heating the coated current collector at a temperature in a range of from about 80 to about 175° C., or from 100 to about 150° C. for a time in a range of from about 0.5 hour to about 3 hours, or from about 1 hour to about 2 hours.

EXAMPLES

Slurry Preparations for Viscosity and Adhesion Tests—Anode Active Material

Modified Guaran Samples

Slurries were prepared using several different formulations for the binder compositions, as presented in Table 1. For each sample in Table 1, the anode active material comprised a powder mixture of graphite and silicon oxide in a weight ratio of 92:5 of graphite to silicon oxide, wherein the anode active material had about a 435 mAh/g initial capacity. The graphite comprised natural graphite available from BTR Energy Materials Co., LTD (Shenzhen, China) and the silicon oxide, $SiO_x$, available from Osaka Titanium Technologies Co., Ltd. (Amagasaki, Hyogo Prefecture, Japan). Additionally, as illustrated in Table 1, the water content varied for each sample and was calculated as a total weight percent of the water in the slurry composition whether added as a binder composition solution or otherwise. The contents of the binder compositions and anode active materials were presented based on the total weights of the slurries. The components of the binder compositions were varied, as indicated in Table 1, wherein examples comprised entirely of components other than guaran are comparative examples and are used to compare the properties of the guaran-containing binder compositions to alternative binder compositions.

The samples in Table 1 were formed by: (1) adding the powder mixture of graphite and silicon oxide to an aqueous solution of a selected binder composition, (2) adding additional water and stirring by hand until the composition formed a paste, (3) mixing the composition for 3 minutes with a Thinky® mixer (available from Thinky Corporation, Tokyo, Japan), (4) adding additional water and mixing for 3 minutes with the Thinky® mixture, (5) adding another amount of water to the composition and mixing for 3 minutes with the Thinky® mixture, and (6) checking the slurry quality and mixing for an additional minute with the Thinky® mixture, if necessary. The amounts of water added to form each sample were determined from the weight percents provided in Table 1.

TABLE 1

| Sample # | Binder Composition Formulation (Weight Ratio, if multiple) | Wt % of Binder Composition | Wt % Anode Active Material | Wt % of Water |
|---|---|---|---|---|
| 1 | GW-45 Carboxymethyl Guaran | 0.69 | 27.64 | 71.67 |
| 2 (comparative) | Aqu D-5284 Carboxymethyl Cellulose/ Ambergum ™ Carboxymethyl Cellulose (2/1) | 0.93 | 37.38 | 61.68 |
| 3 | Aqu D-5284 Carboxymethyl Cellulose/ Ambergum ™ Carboxymethyl Cellulose/ GW-45 Carboxymethyl Guaran (0.67/0.33/1.5) | 0.82 | 32.79 | 66.39 |

TABLE 1-continued

| Sample # | Binder Composition Formulation (Weight Ratio, if multiple) | Wt % of Binder Composition | Wt % Anode Active Material | Wt % of Water |
|---|---|---|---|---|
| 4 (comparative) | Aqu D-5284 Carboxymethyl Cellulose/ Ambergum ™ Carboxymethyl Cellulose/ Aqu D-5592 Polyacrylic Acid (0.67/0.33/1.5) | 1.02 | 40.82 | 58.16 |
| 5 | WG-18 Carboxymethyl Hydroxypropyl Guaran | 0.73 | 29.26 | 70 |
| 6 | Aqu D-5284 Carboxymethyl Cellulose/ Ambergum ™ Carboxymethyl Cellulose/ WG-18 Carboxymethyl Hydroxypropyl Guaran (0.67/0.33/1.5) | 0.83 | 33.33 | 65.83 |
| 7 (comparative) | Kelset ® NF Alginate | 0.64 | 25.53 | 73.83 |
| 8 (comparative) | Aqu D-5284 Carboxymethyl Cellulose/ Ambergum ™ Carboxymethyl Cellulose/ Kelset ® Alginate (0.67/0.33/1.5) | 0.77 | 30.77 | 68.46 |
| 9 (comparative) | Xanthan Gum | 0.73 | 29.26 | 70 |
| 10 (comparative) | Aqu D-5284 Carboxymethyl Cellulose/ Ambergum ™ Carboxymethyl Cellulose/ Xanthan Gum (0.67/0.33/1.5) | 0.83 | 33.33 | 65.83 |
| 11 (comparative) | Kelcosol ® Alginate | 0.83 | 33.14 | 66.03 |
| 12 (comparative) | Manosol ® Alginate | 0.83 | 33.14 | 66.03 |
| 13 (comparative) | Lithiated Alginate F120 NM | 1.28 | 42.55 | 56.17 |
| 14 (comparative) | Aqu D-5284 Carboxymethyl Cellulose/ Ambergum ™ Carboxymethyl Cellulose/ Lithiated Alginate F120NM (0.67/0.33/1.5) | 1.22 | 48.78 | 50 |
| 15 (comparative) | Kelcosol ® Alignate/Lithiated Alginate (1/1.5) | 1.04 | 41.24 | 57.73 |
| 16 (comparative) | GW-3 Guaran | 0.69 | 27.64 | 71.67 |
| 16A (comparative) | Aqu D-5284 Carboxymethyl Cellulose/ Styrene Butadiene Latex (1/1.5) | 1.02 | 41.41 | 57.55 |

Ingredients listed in Table 1:
(1) Carboxymethyl Guaran: Carboxymethyl substituted guaran commercially available as GW-45LF from BJ Services (Houston, TX) having a carboxymethyl degree of substitution of about 0.18.
(2) Aqu D-5284 Carboxymethyl cellulose: Aqualon ™ Aqu D-5284, a commercially available carboxymethyl cellulose available from Ashland, Inc. (Wilmington, DE) with a degree of substitution from 0.8-0.95 and a Brookfield ® viscosity of 2,500-4,500 mPa · s for a 1% solution at 30 rpm with spindle #4.
(3) Ambergum ™: A commercially available carboxymethyl cellulose available from Ashland, Inc. (Wilmington, DE) with a degree of substitution from 0.8-0.95 and a Brookfield ® viscosity of 300-400 mPa · s for a 1% solution at 30 rpm with spindle #4.
(4) Aqu D-5592: a commercially available polyacrylic acid from Ashland, Inc. (Wilmington, DE).
(5) WG-18 Carboxymethyl hydroxypropyl guaran: CMHP Guaran commercially available as WG-18 from Halliburton Energy Services having a carboxymethyl degree of substitution of about 0.14 and a hydroxypropyl degree of substitution of about 0.3.
(6) Kelset ® NF Alginate is available from FMC Biopolymer (Philadelphia, PA).
(7) Xanthan Gum: Rhodopol ® 23, a commercially available xanthan gum product available from Solvay, Rhodia (La Defense, France)
(8) Kelcosol ® Alginate is available from FMC Biopolymer (Philadelphia, PA).
(9) Manosol ® HV Alginate is available from FMC Biopolymer (Philadelphia, PA).
(10) Lithiated Alginate is Protacid ® F120NM available from FMC Biopolymer (Philadelphia, PA).
(11) Guaran: Unsubstituted guaran commercially available as GW-3LDF from Baker Hughes Inc. (Houston, TX).
(12) Styrene Butadiene Latex: JSR ® TR2001, commercially available styrene butadiene latex from JSR Corporation, Tokyo Japan.

Cross-Linked Guaran Samples

Slurries containing a cross-linked guaran/modified guaran (a guaran/modified guaran system) were prepared using different formulations for the binder compositions, as presented in Table 2. For each sample in Table 2, the anode active material comprised (i) graphite having an initial capacity of about 350 mAh/g, (ii) a powder mixture of graphite and silicon oxide in a weight ratio of 92:5 graphite to silicon oxide, wherein the anode active material had a range of about 430 to about 450 mAh/g initial capacity, (iii) a powder mixture of natural graphite, silicon oxide ($SiO_x$), and conductive carbon having an initial capacity of about 600 mAh/g, or (iv) a powder mixture of silicon-graphene and conductive carbon having an initial capacity of about 600 mAh/g. The graphite comprised natural graphite available from BTR Energy Materials Co., LTD (Shenzhen, China), the silicon oxide ($SiO_x$), was available from Osaka Titanium Technologies Co., Ltd. (Amagasaki, Hyogo Prefecture, Japan), the silicon-graphene was available from XG Sciences, Inc. (Lansing, Mich.), and the conductive carbon was C-NERGY™ Super C65 available from Timcal Graphite & Carbon (Bodio, Switzerland). Additionally, as illustrated in Table 2, the water content varied for each sample and was calculated as a total weight percent of the water in the slurry composition whether added as a binder composition solution or otherwise. The contents of the components were presented based on the total weights of the slurries. The components of the binder compositions were varied, as indicated in Table 2, wherein examples that did not comprise an esterification catalyst and/or epoxy resin comprising at least two epoxide groups were for comparative purposes and, as such, are labeled as "reference" samples.

The samples in Table 2 were formed by: (1) adding the anode active material to an aqueous solution of components of a selected binder composition, (2) adding additional water and stirring by hand until the composition forms a paste, (3) mixing the composition for 3 minutes with a Thinky® mixer (available from Thinky Corporation, Tokyo, Japan), (4) adding additional water and mixing for 3 minutes with the Thinky® mixture, (5) adding another amount of water to the composition and mixing for 3 minutes with the Thinky® mixture, and (6) checking the slurry quality and mixing for an additional minute with the Thinky® mixture, if necessary. The amounts of water added to form each sample were determined from the weight percents provided in Table 2.

viscosity solution formed a top layer and the graphite and silicon oxide solution formed a bottom layer in the glass bottles. The slurries were determined to be stable if they stayed in solution for more than 24 hours, preferably more than 5 days.

Additionally, some of the samples, as indicated in Table 3 below, had their viscosities measured two or more days after the initial mixing, whereby a large increase or decrease in the slurry viscosity indicated possible instability of the composition.

TABLE 2

| Sample # | Guaran/Modified Guaran (wt %) | Second Polymer (wt %) | Esterification Catalyst (wt %) | Epoxy Resin (wt %) | Anode Active Material (wt %) | Water (wt %) |
|---|---|---|---|---|---|---|
| 17 | GW-3 Guaran (0.45) | Aqu D-5592 Polyacrylic Acid (0.15) | Sodium Hypophosphite (0.05) | — | 450 mAh/g Graphite/SiO$_x$ (24.8) | 74.6 |
| 18 | GW-3 Guaran (0.33) | Lithiated Polyacrylic Acid (MW = 1.25 MM) (0.625) | Sodium Hypophosphite (0.05) | — | 450 mAh/g Graphite/SiO$_x$ (18) | 81.6 |
| 19 | GW-3 Guaran (0.56) | Li-C8/IB/MaH/MVE (0.62) | Sodium Hypophosphite (0.05) | — | 450 mAh/g Graphite/SiO$_x$ (18) | 68.7 |
| 23 | WG-18 Carboxymethyl Hydroxypropyl Guaran (0.62) | Lithiated Aqu D-5592 Polyacrylic Acid (0.21) | Sodium Hypophosphite (0.21) | — | 450 mAh/g Graphite/SiO$_x$ (33) | 66.0 |
| 24 | WG-18 Carboxymethyl Hydroxypropyl Guaran (0.62) | Lithiated Gantrez™ 139 (0.17) | Sodium Hypophosphite (0.19) | — | 450 mAh/g Graphite/SiO$_x$ (27.3) | 72.0 |
| 25 | WG-18 Carboxymethyl Hydroxypropyl Guaran (0.68) | Lithiated Aqu D-5592 Polyacrylic acid (0.226) | Sodium Hypophosphite (0.19) | — | 450 mAh/g Graphite/SiO$_x$ (36.2) | 62.9 |
| 53 | WG-18 Carboxymethyl Hydroxypropyl Guaran (1.2) | — | Sodium Hypophosphite (0.03) | — | 600 mAh/g Graphite/SiO$_x$/Conductive carbon (18.82) | 80.0 |
| 54 | WG-18 Carboxymethyl Hydroxypropyl Guaran (1.09) | Aqu D-5592 Polyacrylic Acid (1.09) | | Bisphenol A diepoxy (0.22) | 600 mAh/g Graphite/SiO$_x$/Conductive Carbon (34.06) | 63.6 |
| 63 | WG-18 Carboxymethyl hydroxypropyl guaran (0.73) | — | — | | 450 mAh/g Graphite/SiO$_x$ (29.3) | 70 |
| 66 | Carboxymethyl hydroxypropyl guaran (0.722) | — | 2-Methylimidazole (0.014) | Bisphenol A diepoxy (0.041) | 450 mAh/g Graphite/SiO$_x$ (41.2) | 58.0 |

(1) Li-C8/IB/MaH/MVE is lithium salt of a 30 mol % octylamine modified copolymer of isobutylene, maleic anhydride, and methyl vinyl ether.
(2) Lithiated Gantrez™ 139 is a lithium salt of a copolymer of maleic anhydride and methyl vinyl ether. Gantrez™ AN 139 is commercially available from Ashland, Inc. (Wilmington, DE).
(3) Polyacrylic acids having, as specified in the table, molecular weights of 450,000, 1,250,000, and 4,000,000 Daltons are commercially available polyacrylic acids from Sigma Aldrich (St. Louis, MO).

Slurry Stability Measurements-Anode Active Material

Slurry stability was measured for samples 1-16A of Table 1 and 17-19, 23-25, 53-54, 63 and 66 of Table 2 by placing the slurries in capped cylindrical glass bottles, which were then stored at room temperature and periodically observed. Specifically, each slurry sample was placed in 50 mL glass bottles for around 7 days during which the samples were monitored for phase separation phenomena every day. The unstable slurry samples separated such that the water or low Rheology Measurements—Anode Material Viscosities of the experimental slurry compositions were measured with a Brookfield® viscometer from Brookfield Engineering Laboratories, Inc. (Middleboro, Mass.) at 3 rpm and 30 rpm with spindle #4. As indicated in Table 3, the rheology values for some samples were measured (1) in a 17 mL vial immediately after mixing the slurry, and (2) a second time 24 hours or later after the initial formation of the slurry.

TABLE 3

| Sample # | Viscosity in 17 mL Vial (3 RPM/30 RPM) (mPa · s) | Viscosity After Time Period (3 RPM/30 RPM) (mPa · s) | Stability (days) |
|---|---|---|---|
| 1 | 24595/7158 | After 48 hours: 27994/7458 | >5 |
| 2 (comparative) | 14597/7538 | After 48 hours: 22195/8358 | >5 |
| 3 | 22395/5779 | After 24 hours: 25595/6679 | >1 |
| 4 (comparative) | 17996/8018 | After 24 hours: 20396/7478 | >1 |
| 5 | 34193/8478 | After 5 days: 31393/8058 | >5 |
| 6 | 21795/6259 | After 5 days: 20996/6299 | >5 |
| 7 (comparative) | 69385/10938 | After 5 days: 98279/14957 | >3 |
| 8 (comparative) | 11997/5679 | After 5 days: 35392/8378 | >3 |
| 9 (comparative) | 23195/4439 | After 5 days: 28994/4579 | >5 |
| 10 (comparative) | 17996/4679 | After 5 days: 16197/4319 | >5 |
| 11 (comparative) | 19396/7658 | After 5 days: 44790/12217 | <3 |
| 12 (comparative) | 15997/7158 | After 5 days: 9998/5059 | >3 |
| 13 (comparative) | 12797/2659 | Separated overnight | Unstable |
| 14 (comparative) | 5599/5659 | After 5 days: 5700/6100 | >5 |
| 15 (comparative) | 25595/6619 | Separated overnight | Unstable |
| 16 (comparative) | 39392/8038 | After 5 days: 36792/9318 | >3 |
| 16A (comparative) | 11000/63000 | After 5 days: 12000/6420 | >5 |
| 17 | 39392/8038 | — | — |
| 18 | 30593/6339 | — | — |
| 19 | 28394/7638 | — | — |
| 23 | 25195/4499 | 20396/3879 | 2 |
| 24 | 37392/8878 | 35192/8578 | 2 |
| 25 | 8798/6879 | separated | 1 |
| 53 | 70985/7356 | After 2 days: 60187/5857 | 5 |
| 54 | 68985/11198 | After 1 day: 63386/11458 | 5 |
| 63 (comparative) | 34193/8478 | After 5 days: 31393/8058 | >5 |
| 66 | 6039/2230 | — | 1 |

As illustrated above, samples 1, 3, 5 and 6, comprising a carboxymethyl guaran or carboxymethyl hydroxypropyl guaran, all have good stability and useable viscosities. In contrast, the compositions comprising a lithiated alginate had poor solubility and the compositions comprising alginate independent of carboxymethyl cellulose also had less than ideal stability. Additionally, Table 3 illustrates that the compositions comprising carboxymethyl modified and carboxymethyl hydroxypropyl modified guaran have viscosities in the range of the slurry comprising the well-known composition of carboxymethyl cellulose and styrene butadiene latex.

Adhesion Measurements—Electrode (Anode)

Adhesion measurements were obtained by performing a 90 degree peel test on electrodes formed by coating and drying the slurry compositions on copper current collectors.

The electrodes were formed by coating the slurry compositions on copper current collectors having a thickness of between approximately 12.45 and 15 µm and then using a tape caster (doctor blade) to lessen the slurry layer to a wet thickness of approximately 30 µm. The copper current collectors coated with the individual slurry compositions were then dried at 100° C. for 1 hour to evaporate the water from the slurry composition to form a film on the copper current collector. The current collector coated with the dry film was then placed in a roll press for approximately one minute until the film had a thickness in a range of from about 17 µm to about 55 µm, forming an anode electrode.

The electrodes prepared from samples 1-16A were subjected to a 90 degree peel test using a peel test fixture from Instron® (Norwood, Mass.), wherein the electrodes were tested after the one hour of heating at 100° C., as indicated in Table 4. The individual electrode samples were mounted on a stainless steel plate with 3M® double sided scotch tape from 3M Corporation (St. Paul, Minn.) after which the film, which was also stuck to the scotch tape, was peeled off at a rate of 1 foot/min. by the Instron® Instrument during with the Instron® Instrument measured the force necessary to peel the film off the current collector.

Table 4 demonstrates that the adhesion of films formed from slurries comprising carboxymethyl-modified and carboxymethyl hydroxypropyl-modified guaran is as good as, if not better than, the adhesion of films formed from slurries containing traditional binders like, for example, carboxymethyl cellulose and styrene butadiene latex, and/or alternative components. An adhesion above 0.3 gf/mm is generally considered to be acceptable, while an adhesion value above 0.5 gf/mm is considered to be good.

TABLE 4

| Sample # | Average Coating Thickness (µm) | Adhesion (gf/mm) Dried at 100° C. |
|---|---|---|
| 1 | 19 | 3.55 |
| 2 (comparative) | 19.7 | 1.65 |
| 3 | 20 | 1.87 |
| 4 (comparative) | 20.7 | 0.30 |
| 5 | 19.1 | 3.58 |
| 6 | — | 2.22 |
| 7 (comparative) | — | 3.75 |
| 8 (comparative) | — | 3.00 |
| 9 (comparative) | 19 | 2.68 |
| 10 (comparative) | 19.1 | 1.61 |
| 11 (comparative) | 19.1 | 2.94 |
| 12 (comparative) | 19 | 2.59 |
| 13 (comparative) | — | — |
| 14 (comparative) | — | 0.27 |
| 15 (comparative) | — | 0.23 |
| 16 (comparative) | 18.4 | 1.26 |
| 16A (comparative) | 39 | 0.41 |

The electrodes from samples listed in Table 2 were subjected to a 90 degree peel test using a peel test fixture from Instron® (Norwood, Mass.), wherein the electrodes were tested both after the initial hour of heating at 100° C. and, for the applicable samples, after the second hour of heating at 150° C., as indicated in Table 5. The individual electrode samples were mounted on a stainless steel plate with 3M® double sided scotch tape from 3M Corporation (St. Paul, Minn.) after which the film, which was also stuck to the scotch tape, was peeled off at a rate of 1 foot/min. by the Instron® Instrument during which the Instron® Instrument measured the force necessary to peel the film off the current collector.

Table 5 demonstrates that the adhesion of films formed from slurries comprising carboxymethyl-modified and carboxymethyl hydroxypropyl-modified guaran system is as good as, if not better than, the adhesion of films formed from slurries containing traditional binders like, for example, carboxymethyl cellulose and styrene butadiene latex, and/or alternative components. An adhesion above 0.3 gf/mm is generally considered to be acceptable, while an adhesion value above 0.5 gf/mm is considered to be good.

TABLE 5

| | Adhesion (gf/mm) | |
|---|---|---|
| Sample # | Dried at 100° C. | Dried at 150° C. |
| 17 | — | 1.38 |
| 18 | — | 1.96 |
| 19 | — | 1.07 |
| 23 | — | — |
| 24 | — | — |
| 25 | — | — |
| 53 | — | 1.07 |

TABLE 5-continued

| | Adhesion (gf/mm) | |
|---|---|---|
| Sample # | Dried at 100° C. | Dried at 150° C. |
| 54 | — | 2.32 |
| 63 | 3.8 | — |
| 66 | | 0.88 |

Electrochemical Tests—Anode

Half coin cells having a 20 mm diameter and a 3.2 mm height (i.e., "CR-2023" half coin cells) were produced using the anodes obtained above in combination with lithium metal disc cathodes, a polyolefin separator, and an electrolyte comprising a mixture of organic solvents (EC/DMC/DEC=1:1:1, EC—ethyl carbonate, DMC—dimethyl carbonate and DEC—diethyl carbonate) and using 1 M lithium hexafluorophosphate ($LiPF_6$) as the lithium salt. The half coin cells were subjected to cyclic and rate capability tests as various rates, as well as a test to determine impedance of the half coin cells.

Impedance

Impedance of the above-described 2032 half coin cells was measured using a Solartron® 1260 from Soalrtron Analytical (Leicester, UK).

Coulombic Efficiency, Capacity, and Capacity Retention

Electrochemical measurements were taken using a Maccor Model 4000 BCT system. The initial coulombic efficiency percentage was measured after the first cycle at a current of 0.05C. The second coulombic efficiency percentage was measured at the second cycle also at a current of 0.05C. Additionally the capacity was measured at 100 cycles and the capacity retention was measured at 100 cycles at 0.33C.

For half coin cells with an initial capacity of 450 mAh/g, electrochemical properties were measured by: (1) conditioning the coin cells for 3 cycles at c/20 with a cutoff voltage between 0.005 and 1.5 V; (2) measuring the cycling life with constant charge and discharge at c/3 with a cutoff voltage of 0.005 to 1.0 V; and (3) varying the c-rate for 5 cycles at c/20-CC, 5 cycles at c/10-CCCV, 5 cycles at c/5-CCCV, 5 cycles at c/2-CCCV, 5 cycles at 1 c-CCCV, with a CV cutoff current at c/20.

For half coin cells with an initial capacity of 600 mAh/g, electrochemical properties were measured by: (1) conditioning the coin cells for 4 cycles at c/20 with a cutoff voltage between 0.005 and 1.5 V; (2) measuring the cycling life with constant charge and discharge at c/3 with a cutoff voltage of 0.005 to 1.0 V; and (3) varying the c-rate for 5 cycles at c/20-CC, 5 cycles at c/10-CCCV, 5 cycles at c/5-CCCV, 5 cycles at c/2-CCCV, 5 cycles at 1 c-CCCV, with a CV cutoff current at C/20.

Table 6 presents the electrochemical data for the half coin cells made from the compositions in Tables 1 and 2.

TABLE 6

| Sample # | Average Coating Thickness (μm) | Impedance Rct (Ohms) | Initial Coulombic Efficiency (%) | Second Coulombic Efficiency (%) | Charge Capacity 100 Cycles (mAh/g) | Capacity Retention 100 Cycles (%) |
|---|---|---|---|---|---|---|
| 1 | 19 | 119 | 84.9 | 94.8 | 318 | 71 |
| 2 (comparative) | 19.7 | 114 | 87.5 | 96.3 | 300 | 67 |
| 3 | 20 | 135 | 87.9 | 93.7 | 308 | 68 |
| 4 (comparative) | 20.7 | 131 | 89.2 | 97.5 | 292 | 65 |
| 5 | 19.1 | 132 | 84.6 | 95.0 | 306 | 68 |
| 6 | — | 141 | 85.1 | 95.7 | 313 | 70 |
| 7 (comparative) | — | — | — | — | — | — |
| 8 (comparative) | — | — | — | — | — | — |
| 9 (comparative) | 19 | 128 | 83.5 | 95.4 | 306 | 92 |
| 10 (comparative) | 19.1 | 143 | 85.3 | 95.3 | 280 | 89 |
| 11 (comparative) | 19.1 | 186 | 82.5 | 95.9 | 220 | 49 |
| 12 (comparative) | 19 | 178 | 85.8 | 95.7 | 309 | 69 |
| 13 (comparative) | — | — | — | — | — | — |
| 14 (comparative) | — | — | — | — | — | — |
| 15 (comparative) | — | — | — | — | — | — |
| 16 (comparative) | 18.4 | 97 | 78.9 | 93.9 | 270 | 82 |
| 16A (comparative) | 39 | 70 | 84.8 | 96.9 | 304 | 86 |
| 17 | — | 92 | 82.7 | 94.8 | 286 | 64 |
| 18 | — | 93 | 80.5 | 94.6 | 233 | 52 |
| 19 | — | 99 | 81.0 | 94.3 | 266 | 59 |
| 23 | 0.9 | 133 | 80.8 | 95.0 | 309 | 76.4 |
| 24 | 1.2 | 215 | 82.0 | 94.1 | 315 | 76.3 |
| 25 | 1.9 | 112 | 82.7 | 94.6 | — | — |
| 53 | 1.6 | 132 | 77.2 | 90.2 | — | — |
| 63 | — | 132 | 84.6 | 94.6 | — | 96.2 |
| 66 | 4.1 | 94 | 87.5 | 95.9 | 321.1 | 89.9 |

Slurry Preparations and Viscosity Tests—Cathode Active Material

The slurry containing the cathode active material was prepared and tested. All of the materials and their quantities used for preparing Samples 1-2 and Comparative Sample are listed in Table 7. Viscosity of the samples was measured at room temperature in a Brookfield DV-II+Pro LV viscometer using spindle #4 at 3-rpm and 30-rpm with a 3-minute rotation time, and the results are also shown in Table 7.

Sample 1 was prepared as follows:

(a) Aqueous polymer solutions of 1 wt % carboxymethylhydroxypropyl guar (CMHPG, WG™-18, commercially available from Ashland Inc., Covington, Ky.) and 10 wt % polyvinylpyrrolidone (PVP, Plasdone™ K-12, commercially available from Ashland Inc., Covington, Ky.) were prepared and weighed into the 100-mL cup of a Thinky Mixer ARE-310 (commercially available from Thinky Corporation, Tokyo, Japan).

(b) About ⅓ of the total amounts of $Li(NiMnCo)_2$ (Lithium Nickel Manganese Cobalt Oxides, also called NMC, commercially available from BASF, Florham Park, N.J.) and about ½ of the total amounts of water were added into the cup. The components inside the cup were mixed by hand with a spatula until the solids and the Thinky Mixer for 5-minutes at 2000-rpm to form a slurry. The slurry was then poured into a 2-ounce glass jar. The 2-ounce glass jar was lowered into a ~18° C. water bath and then homogenized for ~1-minute at ~10,000-rpm.

TABLE 7

| Sample | Binder composition Formulation (Weight Ratio, if multiple) | Wt % of Binder Composition | Wt % of NMC | Wt % of Carbon Black | Wt % of Water* | Slurry Viscosity (mPa · s, @ 3 RPM/30 RPM) |
|---|---|---|---|---|---|---|
| Sample 1 | WG-18 Carboxymethyl Hydroxypropryl guaran/Styrene Butadiene Latex/PVP (1.395/1.500/0.105) | 1.15 | 35.72 | 1.14 | 62.00 | 14,997/4,879 |
| Sample 2 | GW-45/SBR/PVP (1.395/1.500/0.105) | 1.21 | 37.61 | 1.20 | 59.98 | 14,597/4,839 |
| Comparative Sample | PVDF/PVP (92.7/2.3) | 1.96 | 51.75 | 2.87 | 43.42 (NMP) | —/6,219 |

*NMP instead of water was used in Comparative Sample.

were wetted out. The cup was then covered with Parafilm M® and the components were mixed in the Thinky Mixer for 2 minutes at 2000-rpm.

(c) About ⅓ of the total amounts of NMC was added into the cup and the same mixing procedure was employed as described in step (b) with hand and the Thinky Mixer.

(d) About ⅓ of the total amounts of NMC and about ½ of the total amounts of water were added into the cup. C-Energy™ Super C65 carbon black (commercially available from Timcal America Inc., Westlake, Ohio) was also weighed and added into the cup. The components were mixed by the same procedure as described in step (b) with hand and the Thinky Mixer for 5-minutes at 2000-rpm to form a slurry.

(e) The slurry was then poured into a 2-ounce glass jar with a recorded tare weight. The 2-ounce glass jar was then lowered into an ~18° C. water bath. The slurry was homogenized for ~1-minute at ~14,000-rpm and 20-seconds at ~10,000-rpm using a ProScientific Pro 250 homogenizer with a 20 mm diameter×105 mm Saw Tooth Bottom Generator Probe (commercially available from Pro Scientific Inc., Oxford, Conn.).

(f) 50 wt % of styrene butadiene latex was then weighed and added into the jar and mixed with the slurry.

Sample 2 was prepared using the same steps as Sample 1 except that all of the water was added into the cup at step (b).

Comparative Sample—The polymer solution of 10 wt % of polyvinylidene fluoride (PVDF, Kynar® HSV 800, commercially available from Arkema Inc., King of Prussia Pa.) and 10 wt % of PVP in N-methyl pyrrolidone (NMP) were prepared and weighed into the 100-ml cup of a Thinky Mixer ARE-310. About ⅓ of the total amounts of the NMC and ⅓ of the total amounts of the NMP were added into the cup. The components were mixed by hand with a spatula until the solids were wetted out. The cup was covered with Parafilm M® and mixed in the Thinky Mixer for 2-minutes at 2000-rpm. About ⅓ of the total amounts of the NMC and NMP were added into the cup. The components were mixed using the same procedure as described above by hand and the Thinky Mixer for 2-minutes at 2000-rpm. About ⅓ of the total amounts of the NMC and NMP were added into the cup. The C-Energy™ Super C65 carbon black was then weighed and added into the cup. The components were mixed by the same procedure as described above by hand Electrode (Cathode) Preparation Samples 1 and 2

A piece of aluminum foil (17 micrometer) was loaded onto an Automatic Thick Film Coater with 12"W×24"L Glass Bed and 250 mm Adjustable Doctor Blade (MSK-AFA-I, commercially available from MTI Cooperation, Richmond, Va.) and the foil was held in place by vacuum. The slurry was stirred in the jar using a spatula and then deposited on the foil near the blade and a drawdown was made at coating speed of ~2 cm/s. The film was dried for at least 15-hours at ambient conditions in a hood. The film was then dried in a forced air convection oven at 60° C. for 30-minutes and at 80° C. for 30-minutes, and then dried in a vacuum oven for 30-minutes at 100° C. A 7/16-inch circular diameter punch was used to punch the coated aluminum foil to form electrodes.

The electrodes were placed into a glass vial. The vial was then placed into a 100° C. oven under vacuum for 15-hours before it was transferred into an argon-filled glove box. The coating weights of 9.9 mg/cm$^2$ for Sample 1 and 10.1 mg/cm$^2$ for Sample 2 were obtained based on the cathode active material.

Comparative Sample

A piece of the aluminum foil was loaded onto the Automatic Thick Film Coater with the vacuum on. The slurry was deposited on the foil near the blade and the drawdown was made with ~2 cm/s speed. The film was dried for 2-days at ambient conditions in a hood. The film was then dried in a forced air convection oven at 60° C. for 30-minutes and at 80° C. for 30-minutes, and then was dried at 100° C. under vacuum for 2-hours. A 7/16-inch circular diameter punch was used to punch the coated aluminum foil to form electrodes. The cut electrodes were placed into a glass vial. The glass via was placed into a 100° C. oven under vacuum for 15-hours before it was transferred into the argon atmosphere glove box. A coating weight of 9.8 mg/cm$^2$ was obtained based on the cathode active material.

Electrochemical Testing—Electrode (Cathode)

Half coin cells having a 20 mm diameter and a 3.2 mm height (i.e., "CR-2023" half coin cells) were prepared using the cathodes obtained above in combination with lithium metal disc anodes, a polyolefin separator, and an electrolyte comprising a mixture of organic solvents (EC/DMC/DEC, 1:1:1) using 1 M lithium hexafluorophosphate (LiPF$_6$) as the lithium salt. The half coin cells were subjected to conditioning cycles (four cycles were used), cycling test and rate capability tests at various discharge rates, as well as a test to determine impedance of the half coin cells after the conditioning cycles. Cell impendence was measured using Solartron® SI 1260 Impedance Analyzer/SI 1287 Interface instrument.

Electrochemical tests were carried out using the Maccor Model 4000 BCT system. The initial coulombic efficiency percentage was measured after the first cycle at a current of c/20 under constant current followed by constant voltage (CCCV) until the current reached c/200. The second coulombic efficiency percentage was measured at the second cycle under the same c/20 with CCCV and the current cut off. After the initial conditioning cycles, the capacity and the capacity retention were measured at 100 cycles with c/2 cycling rate under CCCV until the current reached c/20. Additionally, the discharge rate capability was measured by varying the C-rate for 2 cycles at c/20, 2 cycles at c/10, 2 cycles at c/5, 2 cycles at c/2, and 2 cycles at 1C, and 4 cycles at 2C, 4 cycles at 5C, 4 cycles at 10C and 4 cycles at 20C. The test results are listed in Table 8.

TABLE 8

| Sample | Areal coating Weight (Active, mg/cm$^2$) | Impedance $R_{ct}$ (Ohms) | Initial Coulombic Efficiency (%) | Second Coulombic Efficiency (%) | Discharge Capacity @ 100 Cycle (mAh/g) | Capacity Retention @ 100 Cycle (%) | Discharge Capacity @ 5C rate (mAh/g) | Capacity Retention @ 5C rate (%) |
|---|---|---|---|---|---|---|---|---|
| Sample 1 | 9.9 | 114 | 90.5 | 99.3 | 124 | 79 | 52 | 32 |
| Sample 2 | 10.1 | 81 | 87.2 | 98.8 | 151 | 93 | 85 | 52 |
| Comparative Sample | 9.8 | 143 | 91.3 | 97.7 | 146 | 88 | 0 | 0 |

What is claimed is:

1. A slurry for use in preparation of a lithium ion battery, comprising:
   an electrode active material, wherein the electrode active material comprises at least one of an anode active material and a cathode active material;
   a binder composition comprising a modified guaran, wherein the modified guaran is selected from the group consisting of carboxyalkyl guaran, carboxyalkyl hydroxyalkyl guaran, and combinations thereof; and
   water.

2. The slurry of claim 1, wherein the cathode active material comprises lithium-containing transition metal oxides selected from the group consisting of lithium iron phosphate (LiFePO$_4$), lithium cobalt oxide (LiCoO$_2$), lithium nickel oxide (LiNiO$_2$), lithium nickel cobalt aluminum oxide (LiNiCoAlO$_2$), lithium nickel manganese cobalt oxide (LiNiMnCoO$_2$), lithium manganese oxide (LiMn$_2$O$_4$), and combinations thereof.

3. The slurry of claim 1, wherein the anode active material is selected from the group consisting of artificial graphite, natural graphite, surface modified graphite, coke, hard carbon, soft carbon, carbon fiber, conductive carbon, and combinations thereof.

4. The slurry of claim 3, wherein the anode active material further comprises at least one of silicon and silicon oxide.

5. The slurry of claim 1, wherein the anode active material comprises silicon-graphene.

6. The slurry of claim 5, wherein the anode active material further comprises graphite.

7. The slurry of claim 6, wherein the anode active material further comprises conductive carbon.

8. The slurry of claim 1, wherein the modified guaran is lithiated.

9. The slurry of claim 1, wherein the binder composition further comprises at least one of a carboxyalkyl cellulose, carboxyalkyl hydroxyalkyl cellulose, and combinations thereof.

10. The slurry of claim 1, wherein the binder composition further comprises a second polymer selected from the group consisting of polyacrylic acid, polyacrylic acid copolymer, methyl vinyl ether and maleic anhydride copolymer, modified methyl vinyl ether and maleic anhydride copolymer, styrene maleic anhydride copolymer, xanthan gum, alginate, gum arabic, and combinations thereof.

11. The slurry of claim 1, wherein the binder composition further comprises a polycarboxylic acid.

12. The slurry of claim 11, wherein the polycarboxylic acid is in a basic solution or lithiated to form a lithium salt of the polycarboxylic acid.

13. The slurry of claim 10, wherein the binder composition further comprises at least one of (a) an esterification catalyst and (b) an epoxy resin comprising at least two epoxide groups.

14. The slurry of claim 13, wherein the esterification catalyst is selected from the group consisting of sodium hypophosphite, sulphonic acid, methane sulphonic acid, trifluoromethane sulphonic acid, titanate esters, dialkyl tin, and combinations thereof.

15. The slurry of claim 13, wherein the epoxy resin comprises at least two epoxide groups and is at least one of a di-epoxy, tri-epoxy, tetra-epoxy, and combinations thereof.

16. The slurry of claim 15, wherein the binder composition further comprises an epoxy cross-linking catalyst selected from the group consisting of tertiary a mines, quaternary a mines, imidazoles, phosphonium compounds, chelates, and combinations thereof.

17. A film for use in preparation of a lithium ion battery, comprising:
   an electrode active material, wherein the electrode active material comprises at least one of an anode active material and a cathode active material; and
   a binder composition comprising a modified guaran, wherein the modified guaran is selected from the group consisting of carboxyalkyl guaran, carboxyalkyl hydroxyalkyl guaran, and combinations thereof.

18. The film of claim 17, wherein the modified guaran is lithiated.

19. The film of claim 17, wherein the binder composition further comprises at least one of a carboxyalkyl cellulose, carboxyalkyl hydroxyalkyl cellulose, and combinations thereof.

20. An electrode capable of use in a lithium ion battery, comprising:
   a film of claim 17; and
   a current collector.

21. The electrode of claim 20, wherein the current collector is made of a material selected from the group consisting of aluminum, carbon, copper, stainless steel, nickel, zinc, silver, and combinations thereof.

* * * * *